United States Patent [19]

Carlson

[11] Patent Number: 4,522,146

[45] Date of Patent: Jun. 11, 1985

[54] BURGLAR ALARM SYSTEM INCORPORATING PNEUMATICALLY OPERATED COMPONENTS

[76] Inventor: Heinz F. Carlson, 200 Kenny Crt., Santa Cruz, Calif. 95065

[21] Appl. No.: 409,016

[22] Filed: Aug. 17, 1982

[51] Int. Cl.[3] ......................... G03B 19/00; G08B 1/04

[52] U.S. Cl. ......................................... 116/2; 116/76; 116/86; 354/76

[58] Field of Search ....................... 137/557, 560, 551; 354/76, 75; 116/7, 2, 3, 85, 86, 100, 70, 75

[56] References Cited

U.S. PATENT DOCUMENTS

| | | | |
|---|---|---|---|
| 1,978,500 | 10/1934 | Meyer | 354/76 |
| 2,139,703 | 12/1938 | Taylor | 354/76 |
| 3,045,775 | 7/1962 | Pretini | 116/86 |
| 3,057,321 | 10/1962 | Pretini | 116/86 |
| 3,594,747 | 7/1971 | Cronin | 354/75 |
| 3,682,129 | 8/1972 | Philbrick | 116/70 |
| 4,035,792 | 7/1977 | Price | 354/76 |

*Primary Examiner*—Steven L. Stephan
*Assistant Examiner*—Denis E. Corr
*Attorney, Agent, or Firm*—John J. Leavitt

[57] ABSTRACT

Presented is a burglar alarm system for installation in residential, commercial or industrial premises. The burglar alarm system incorporates photographic equipment which photographs the intruder and a pneumatically operated audible alarm.

17 Claims, 1 Drawing Figure

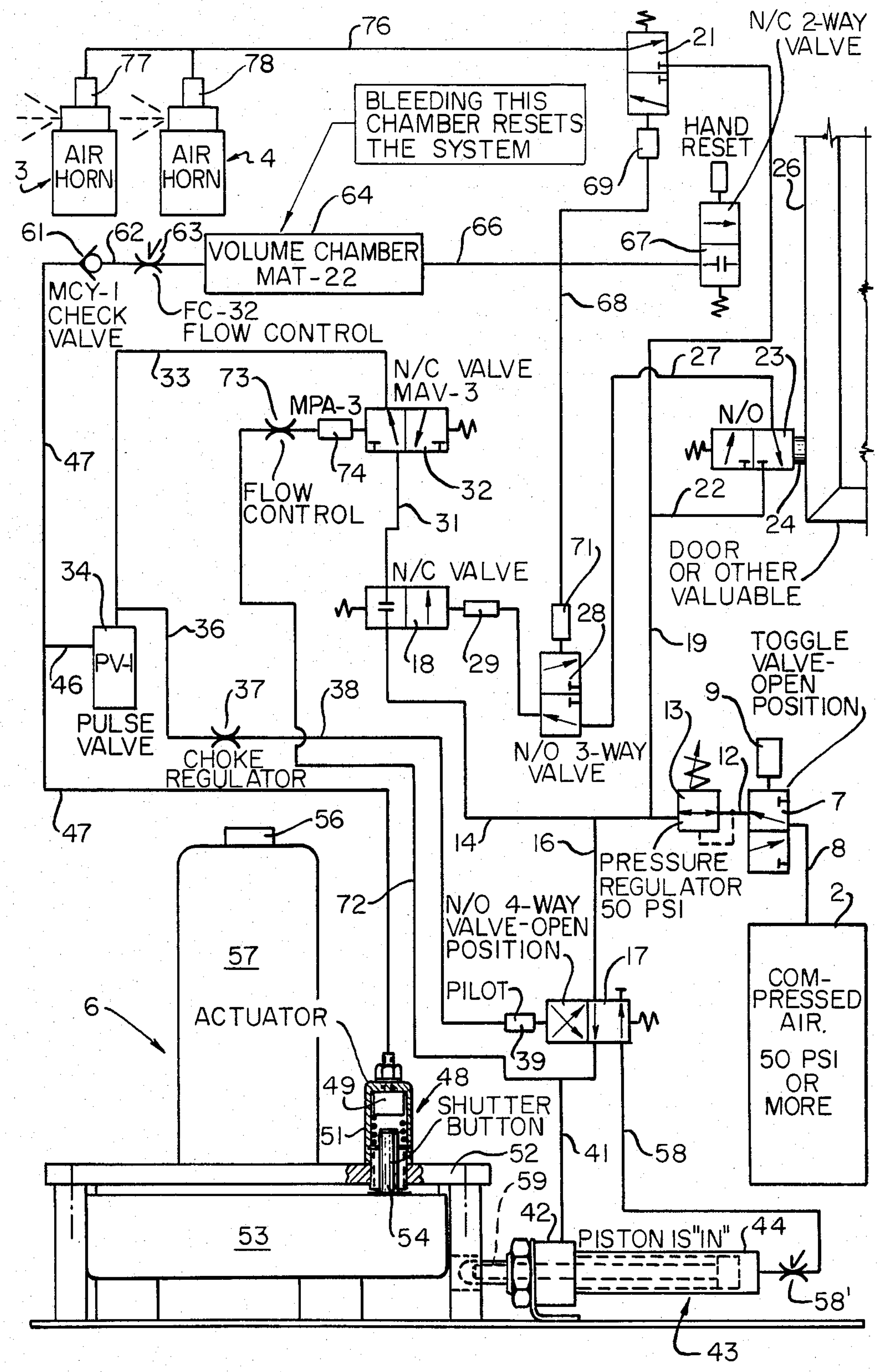
76
77
78
21
N/C 2-WAY VALVE
AIR HORN
AIR HORN
3
4
BLEEDING THIS CHAMBER RESETS THE SYSTEM
HAND RESET
69
26
64
61
62
63
VOLUME CHAMBER MAT-22
66
67
MCY-1 CHECK VALVE
FC-32 FLOW CONTROL
68
27
23
33
N/C VALVE MAV-3
73
MPA-3
N/O
47
74
FLOW CONTROL
32
22
31
24
DOOR OR OTHER VALUABLE
34
N/C VALVE
71
36
28
19
PV-1
18
29
TOGGLE VALVE-OPEN POSITION
46
37
38
9
PULSE VALVE
CHOKE REGULATOR
N/O 3-WAY VALVE
13
12
7
47
56
14
16
PRESSURE REGULATOR 50 PSI
8
2
72
N/O 4-WAY VALVE-OPEN POSITION
57
6
ACTUATOR
PILOT
17
COM-PRESSED AIR. 50 PSI OR MORE
39
49
48
SHUTTER BUTTON
51
52
41
58
59
42
PISTON IS "IN"
44
53
54
58'
43

BURGLAR ALARM SYSTEM INCORPORATING PNEUMATICALLY OPERATED COMPONENTS

BACKGROUND OF THE INVENTION

1. Field of the Invention

This invention relates to burglar alarm systems, and particularly to a pneumatically operated system which activates photographic equipment to take a picture of the intruder, activates a light in the area of intrusion, and sounds an audible alarm.

2. Description of the Prior Art

It is believed that the prior art relevant to the subject invention may be found in the following classes and sub-classes:

Class 340, sub-classes 626, 544, 545, 540, 404
Class 354, sub-classes 75, 76
Class 346, sub-classes 107.

A search in the area indicated, has revealed the existence of the following U.S. Patents:

| | | |
|---|---|---|
| 2,012,818 | 3,725,886 | 3,531,794 |
| 3,349,679 | 3,594,747 | 4,063,251 |
| | 3,672,269 | |

Referring to these patents, it is noted that U.S. Pat. No. 2,012,818 relates to an air horn that is operated by the vacuum in the induction system of an automobile engine when the electro-suction control unit is actuated by pressing a button within the automobile. This permits air to be drawn through the horn by the vacuum in the induction system.

U.S. Pat. No. 3,349,679 relates to photo identification apparatus mounted within an automobile, such as a taxi cab, and which is actuated when the rear door of the taxi cab is opened and closed after entry of a passenger into the back seat of the vehicle. The system is arranged to illuminate the back seat of the vehicle, including the use of high intensity flashes of light.

U.S. Pat. No. 3,594,747 describes a surveilance system for banks where a camera is programmed to operate at a normal rate but which may be accelerated upon command in the event of a robbery. An audible alarm is sounded after an adjustable time delay following accelerated operation of the camera.

U.S. Pat. No. 3,531,794 is directed to the problem created by people who turn in false fire alarms. This device is intended to turn on a light, sound an alarm and simultaneously activate a camera to take a picture of the person that has tripped the alarm.

U.S. Pat. No. 3,672,269 relates to a structure including a hidden camera that is sequentially operated when intrusion into a room is detected by a detection system that is not disclosed by this patent.

U.S. Pat. No. 3,725,886 relates to a fluid powered alarm system in which intrusion is detected by an appropriate intrusion detection system, which is connected to a transmitter, with the transmitter in turn transmitting a signal to an appropriate receiver associated with the alarm unit.

U.S. Pat. No. 4,063,251 is directed to a security system applicable particularly to lockers such as in a bank vault or in an equipment storage facility or for that matter in any facility. Each locker is equipped with a normally open push button switch which is actuated when the door is opened.

While various types of alarm systems have been patented, as indicated by the patents noted above, I have been unable to find a pneumatically operated system which is independent of other power sources and which may be easily installed in residential, commercial or industrial premises and which has sufficient versatility to not only sound an audible alarm, but to initiate illumination of the premises and simultaneously to photograph the intruder. Accordingly, it is one of the objects of the present invention to provide a burglar alarm system that incorporates pneumatic means for operation and fulfills these characteristics.

The concept of security of ones property wherever it may be located is a complex one. The subject is complex not only because an intrusion violates a property right with which the property owner is emotionally involved and therefor may trigger a very traumatic reaction on the part of the owner, but it is complicated also because it appears that the law does not protect the owner of the property to the extent that he may believe it protects him. For instance, the law in general holds that human life is more valuable than property. Accordingly, in several cases that have had wide publicity in the media, home owners who attempted to protect their own property and either killed or severely injured an intruder, have found themselves embroiled in lengthy and very expensive law suits. Accordingly, another object of the present invention is to provide a burglar alarm system that will be activated by an overt act of the intruder, and which will simultaneously activate photographic equipment so as to preserve the fact of intrusion on film and at the same time identify the intruder, and then activate an alarm which hopefully will cause the intruder to immediately leave the premises.

There have been many different types of burglar alarm systems installed in residential, commercial and industrial properties. These systems run the gamut from induction type systems that protect the entire building by monitoring the inductance of the interior of a building and sound an alarm when the inductance changes as the result of an intrusion by a human being. Similar type burglar alarm systems working on a capacitive principle have also been installed and work on the premise that the alarm be sounded as soon as an intrusion is either attempted or effected from the outside of the premises to the inside thereof. Other types of burglar alarms incorporate light beams which when broken by the inter-position of an object, such as the human body or a hand or leg, activates an alarm to signal the fact of intrusion. Still other burglar alarm systems are "hard wired" and depend upon the physical disruption of an electrical circuit by the breaking of an electrical conductor. So far as is known, none of these systems simultaneously illuminate the premises being intruded and at the same time photograph the intruder for purposes of evidence in a subsequent prosecution of the intruder, and then sound an alarm to frighten the intruder into flight. Accordingly, another object of the present invention is the provision of a burglar alarm system which is sufficiently versatile to sound an alarm, illuminate the premises and photograph the intruder in relation to intrusion into the premises from the outside thereof, and which is also applicable in a given or designated area within the premises, such as a bank vault, a bedroom, or a storeroom in a commercial establishment.

Another object of the invention is the provision of a pneumatically operated burglar alarm system which is activated by an overt act of the burglar, such as opening a door or window, and which will first photograph the intruder, illuminate the scene during the momentary photographic process, and subsequently sound an alarm to frighten the burglar into flight.

The invention possesses other objects and features of advantage, some of which, with the foregoing, will be apparent from the following description and the drawings. It is to be understood however, that the invention is not limited to the embodiment illustrated and described, since it may be embodied in various forms within the scope of the appended claims.

SUMMARY OF THE INVENTION

In terms of broad inclusion, the burglar alarm system of the invention is preferably pneumatically operated and is preferably installed in an interior room or area into which an intruder bent on burglary would normally enter, such as a bedroom, a bank vault, or a store room, these rooms being contained within larger premises and normally being provided with only a single access door to the interior of these rooms from the general area of the premises. Thus, in the preferred installation, a burglar might gain access to the interior of the premises viewed as a whole without activating an alarm. However, once inside the premises, if he approaches the specific or designated area in which the pneumatically operated burglar alarm system of this invention was installed, and proceeds through an overt act on his part to open the door leading to such protected area, then the pneumatically operated burglar alarm system of this invention is automatically activated.

The pneumatically operated burglar alarm system of this invention then is used in conjunction with an opening into a protected area, with opening of the door or window to the protected area being the overt act required by the intruder to initiate the system. The system includes one or more compressed air tanks that provide a source of air under pressure. Release of such air under pressure is controlled by a sensing device in the form of a valve associated with the door or other opening into the room to be protected. When the door to the room is opened, the valve is actuated and triggers air actuation of a series of air-actuated valves that operate in a prescribed sequence to initially operate photographic equipment that takes a series of pictures of the intruder in a very short interval. Following the photographic recordation of the fact of intrusion and the recordation on film of the identity of the intruder, the system activates one or more air horns which sound an audible alarm in the immediate area. The psychological effect of actuation of the photographic equipment, which is normally accompanied by flashing lights, is to surprise the intruder. He may or may not know or realize that he has been photographed. Subsequently, with the sounding of the air horns, the effect is to frighten the intruder and cause the intruder to leave the premises.

BRIEF DESCRIPTION OF THE DRAWINGS

The single FIGURE is a complete schematic illustrating the system applied in a single room and adapted to be activated by the opening of a door to that room. The system is shown armed for activation of the alarm upon opening of the door.

DESCRIPTION OF THE PREFERRED EMBODIMENT

In terms of greater detail, the pneumatically operated burglar alarm system of the invention operates from a source of air under pressure designated generally by the numeral 2 in the accompanying drawing, the source of air conveniently being a cylinder that is filled with air to at least 50 pounds per square inch pressure. Obviously, greater pressure may be utilized, however, it has been found that 50 Psi is sufficient to activate the burglar alarm system and keep it operating for a reasonable length of time. The system includes a pair of air horns 3 and 4, and a flash camera unit designated generally by the numeral 6. Actuation of these components in their appropriate sequence is controlled by approximately eight pneumatically operated valves interconnected in such a way with each other and with other air controlled devices to operate the system in the manner in which it is intended, as will hereinafter be described.

Referring to the drawings, the flow of compressed air from the compressed air cylinder 2 is controlled by a manually operated toggle valve 7 connected to the output port of the compressed air cylinder by a conduit 8. The conduit 8 is preferably of the flexible plastic type and may conveniently be a one-eighth or one-quarter inch internal diameter type conduit. Obviously, other appropriate sizes of conduit may be used. It should also be understood that when reference is made to a valve structure that the valve structure is intended to control the flow of air in all instances with actuation of a valve sometimes being effected by an air pulse and at other times actuation of a valve being manual in the sense that it is manipulated by hand rather than manipulated into an open or closed position by an air pulse.

As illustrated in the drawings, the air valve 7 is provided with the toggle 9 that is manually manipulable and in the drawing shown symbolically in a valve-open position through use of the Joint Industry Conference symbols. Connected to the outlet port of the valve 7 by an appropriate conduit 12 is an adjustable pressure regulator 13 adjustable to a selected pressure and for the present system, adjusted to a pressure of at least 50 Psi.

The output from the pressure regulator 13 is connected through conduit 14 and conduit 16 with a normally open four-way pilot-operated valve 17 shown in open position in the drawings. Junction points between conduits are shown schematically inasmuch as the components for such interconnections are conventional. The output of the pressure regulator is additionally connected by the conduit 14 to the input port of the normally closed valve 18, and connected by conduit 19 to the input port of normally closed pilot-operated valve 21. Additionally, through a branch conduit 22 connected to the conduit 19, air under pressure is supplied to the input port of a normally open two-position spring-pressed valve 23 the actuator 24 of which is depressed by the edge of the door 26 into a valve-closed position so that air cannot pass through the valve until opening of the door causes the spring-pressed plunger or actuator 24 of the valve 23 to be released, thus returning the closed valve to its normally open condition.

When this occurs, air under pressure passes to the output port of valve 23, which is connected by conduit 27 to the input port of normally open pilot-operated three way valve 28. Since the valve 28 is normally open, air under pressure continues through this valve to actuate the pilot 29 of the normally closed pilot-operated valve 18, thus opening this valve and permitting air under pressure to pass through the valve to its output port, which is connected by a conduit 31 to the input port of a normally closed pilot-operated valve 32. While this valve is a normally closed valve, it is held open by air pressure passing through valve 17 as will hereinafter be explained. Thus, since valve 32 is held open, air passes through the valve and out the output port thereof which is connected by a conduit 33 to the input of a pulse valve 34.

The conduit 33 is also connected by conduit 36 with the input of air choke 37, the function of which will hereinafter be explained. The output end of the air choke or regulator is connected by conduit 38 to the pilot 39 of normally open four-way valve 17, thus actuating this valve in a timed manner. Since this normally open valve 17 was initially in open position, the output port of the valve was connected by a conduit 41 to one end 42 of an air cylinder designated generally by the numeral 43, causing the piston 44 within the air cylinder to be retracted into the cylinder in its "IN" position. The piston 44 is held in such position so long as the normally open valve 17 remains open and air under pressure passes therethrough and through the conduit 41 and the head-end 42 of the air cylinder.

While the valve 17 is actuated in a "timed" manner by air passing through conduits 33, 36, choke 37, and conduit 38, air from conduit 33 also passes into the pulse valve 34. The output from the pulse valve passes through conduit 46 and is channeled into conduit 47, the lower branch of which connects to a pressure responsive actuator designated generally by the numeral 48 and including a spring pressed piston 49 actuated by a pressure responsive ram 50 enclosed within a body 51 the lower end of which is appropriately threaded and mounted in a bracket 52 within which the camera 53 is rigidly secured. The actuator button 54 of the camera, other-wise known as the shutter release button, is in a position to be engaged by the lower end of the displaced piston 49 when a pulse of air under pressure is conveyed to the actuator housing 51 to advance the ram 50. The shutter button is thus depressed, and the camera actuated, with one of the flash lamps 56 being activated to light up the scene. The shutter button is then spring-returned to its original position. I have found it convenient to use an ordinarily hand-held camera, such as the kodak camera equipped with a flash unit including an upstanding magazine 57 containing a multiplicity of the flash lamps 56. The camera is securely mounted in the bracket 52 which is supported in any convenient manner.

Following actuation of the camera and the taking of the picture, the normally open valve 17 is actuated so that conduit 41 is connected to the exhaust port of the valve, and conduit 58 is substantially simultaneously connected to the pressure side of the valve. Accordingly, once pressure is imposed through the conduit 58, the application of which is controlled by the adjustable flow control unit 58', the piston 44 within the air cylinder 43 is caused to advance, causing the ram 59 of the piston to advance forwardly and engage the film advancing lever of the camera. I have found it expedient to utilize an air cylinder 43 of such size and dimensions that the piston must be actuated twice to fully advance the film from one frame to the next. It will of course be understood that many different interrelations between the air cylinder 43 and the camera film advance lever may be made without departing from the invention.

The output of the pulse valve 34 is also connected through the upper branch of conduit 47 with a check valve 61, the output of which is connected by a conduit 62 to an adjustable flow control device 63, the output of which in turn is connected by an appropriate conduit into a volume chamber 64. The output port of the volume chamber 64 is connected by a conduit 66 with the input port of a valve 67 which constitutes a normally closed two-way valve that is manipulable by hand to effect resetting of the system after actuation in a manner in which will hereinafter be explained. The output conduit 66 from volume chamber 64 is also connected to a conduit 68 which is connected to one end to the pilot actuator 69 of the normally closed three-way valve 21, and connected at its other end to the pilot actuator 71 of normally open three-way valve 28 as shown.

When control valve 17 is caused to be activated by the pressure in conduit 38, the conduit 41 is immediately connected to the exhaust port of valve 17, thus reducing the pressure at the head-end 42 of the air cylinder 43, and also causing the conduit 72 to be reduced in pressure by connection to the exhaust port. The conduit 72 is connected through a flow control device 73 with the pilot actuator 74 of normally closed control valve 32, which, as previously explained, is held in open condition by pressure in conduit 72. Release of this pressure causes the activation of the valve 32 to its normally closed condition, the activation being timed by the flow control means 73. This shifting of the open valve 32 back to its normally closed condition causes the conduit 33 to be shifted to the exhaust port, thus causing normally open four-way valve 17 to be shifted to its original position. Such shifting of normally open four-way valve 17 to its original position re-connects conduit 41 to the output of the pressure regulator 13, thus pressurizing the head end 42 of the air cylinder 43, causing the piston 44 to reciprocate therewithin by the successive pressurizing and release of pressure in the conduits 41 and 58.

At this point, after one complete cycle of the system, the second cycle of camera actuation is commenced. Each time the pulse valve 34 sends a pulse of high pressure air to the camera actuator 48, a pulse will also pass through the check valve 61 and flow control unit 63 into the volume chamber 64. Simultaneously, the pilot actuator 39 of valve 17 is actuated to initiate reciprocation of the ram of the air cylinder in a "timed" relationship with actuation of the camera. After eight complete cycles of the air cylinder 43, comprising two cycles to actuate the transport mechanism of the film in the camera 53 for each picture taken, the volume chamber 64 will be filled with air to a sufficient volume and pressure to operate the three-way valve 21, shifting it from its normally closed position to an open position in which air under pressure from the conduit 19 passes through the valve body into the conduit 76, the terminal end of which is connected to actuators 77 and 78 of the air horns 3 and 4, respectively.

Since the pressure that emanates from the volume chamber 64 through conduit 66 is also connected by conduit 68 to pilot actuator 71 of valve 28, the normally open valve 28 will be actuated and shifted to a closed position after eight cycles of the air cylinder 43. This will in turn de-activate the normally closed valve 18, thus terminating the reciprocating action of the air cylinder 43. It will be seen that since the complete cycle encompasses eight actuations of the air cylinder, and since two actuations are required to transport the film in the camera from one frame to another, after eight complete cycles of the air cylinder 43, four pictures will have been taken of the intruder, and the air horns 3 and 4 will remain blasting until the valve 67 is depressed by hand to reset the entire system, or until the air in the cylinder 2 is exhausted.

As illustrated, the pneumatic burglar alarm system of the invention is intended to be self-contained and completely independent of outside power supplies or sources of electrical energy. Because of its versatility and the relatively small size of the components, the entire system may be located in a manner that the built-in camera is aimed at a strategic point in the house or room or area to be protected, such strategic point being the point most likely to provide access for an intruder. Tests of this system have proven that the system cannot be made inoperable by a power failure or cutting of electrical supply lines to the residence or other structure by an intruder. The entire system, again because of its limited size, including the compressed air cylinder, is built into a single box or receptacle which may resemble a number of books stacked side-by-side on a shelf. This camouflage prevents early detection or location of the system by a burglar. Only a small opening is required in the box containing the system for the camera lens and the flash. Additionally, while the system has been described and illustrated as being used primarily for an interior room or area, it is obvious that the system may accommodate installation in many different ways. For instance, the actuator button 24 associated with valve 23 may be abutted against any stationary object of considerable value so that if the object is moved, the plunger is released and the system is activated.

Having thus described the invention, what is sought to be protected by letters patent of the United States is as follows.

I claim:

1. A self-contained intruder alarm system that is independent of external energy sources for activation and which is adapted to be installed in a room or building into which an intruder may attempt to gain access and which is activated by an overt act by the intruder, comprising:
   - (a) camera means adapted to be activated by the system to photograph the intruder upon commission of the overt act;
   - (b) alarm means adapted to be activated by the system to sound an audible alarm as a result of the commission of the overt act by the intruder; and
   - (c) pneumatic circuit means cooperatively interconnecting said camera means and said alarm means and including a source of air under pressure and a valve actuated by the commission of said overt act by the intruder to activate the circuit means to actuate the camera means and sound the audible alarm means.

2. The combination according to claim 1, in which said camera means includes means for illuminating the intruder when the camera means is activated.

3. The combination according to claim 1, in which said pneumatic circuit means includes means for delaying activation of the audible alarm until after the camera means has been activated a predetermined number of times.

4. The combination according to claim 1, in which said pneumatic circuit means includes a pneumatic primary circuit and a pneumatic secondary circuit, said secondary circuit including said means for delaying activation of the audible alarm until after the camera means has been activated a predetermined number of times.

5. The combination according to claim 1, in which said pneumatic circuit means includes a pneumatic primary circuit and a pneumatic secondary circuit, said pneumatic primary circuit including a valve selectively operable to arm the alarm system by pressurizing the pneumatic primary circuit, and a pneumatically operated normally-closed valve interposed between said pneumatic primary circuit and said pneumatic secondary circuit and operable to charge said pneumatic secondary circuit with pressurized air from said source upon commission of said overt act.

6. The combination according to claim 5, in which said pneumatic primary circuit includes a double-acting air cylinder including a ram movable in a direction to retract the ram into said air cylinder by air pressure in said primary circuit, and movable in the opposite direction to extend the ram from said air cylinder to actuate said camera means upon the commission of said overt act.

7. The combination according to claim 5, in which said primary circuit includes a normally open four-way pilot actuated valve and a double-acting air cylinder and ram connected to said normally open four-way pilot actuated valve actuation of said four-way valve effecting reciprocation of said ram in said air cylinder.

8. The combination according to claim 5, in which said primary circuit includes a normally closed pilot actuated valve interposed directly between said source of air under pressure and said audible alarm means, said normally closed valve being actuable to open position upon pressurization of said secondary circuit.

9. The combination according to claim 5, in which said secondary circuit includes a normally closed pilot actuated valve operatively interposed between said primary circuit and said secondary circuit and held in open position by pressure in said primary circuit.

10. The combination according to claim 5, in which said secondary circuit includes a pulse valve and a volume chamber adapted to receive pulses of high pressure air from said pulse valve, and shutter actuator means on said camera means actuable by pulses of high pressure air from said pulse valve.

11. The combination according to claim 5, in which said secondary circuit includes a pair of flow control means operable to regulate the flow of air, one of said flow control means being interposed between said secondary circuit and said primary circuit.

12. The combination according to claim 9, in which said primary circuit includes a flow control device interposed between said primary circuit and said normally closed pilot actuated valve operatively interposed between said primary and secondary circuits.

13. The combination according to claim 5, in which said primary circuit includes a normally open pilot actuated four-way valve, a normally closed two-way pilot actuated valve, a normally closed three-way pilot actuated valve, and said secondary circuit is connected to the pilot actuators of said valves to effect actuation thereof upon the commission of said overt act.

14. The combination according to claim 5, in which said secondary circuit includes a pair of three-way pilot actuated valves, one of said valves being normally closed and the other being normally open, said pair of valves being switched to the opposite condition when said secondary circuit is pressurized.

15. The method of operating a pneumatically operated intruder alarm system including a source of air under pressure, a camera for photographing the intruder, an audible alarm to frighten the intruder, and primary and secondary pneumatic circuits made up of valves and conduits interconnecting said source of air under pressure with said camera and said audible alarm, the steps comprising:

(a) causing said primary pneumatic circuit to be pressurized by air from said source of air under pressure to arm the alarm system;

(b) causing high pressure air to flow into said secondary pneumatic circuit from said primary pneumatic circuit when an intruder activates the system by committing an overt act; and (c) controlling the flow of air in said secondary pneumatic circuit to successively actuate the camera a predetermined number of times and then terminating actuation of the camera and subsequently activating the audible alarm.

16. The method according to claim 15, in which said secondary pneumatic circuit is caused to be deactivated when said audible alarm is activated.

17. The method according to claim 16, in which said audible alarm is caused to be terminated by interruption of said primary pneumatic circuit by manual manipulation of a valve in said secondary pneumatic circuit.

* * * * *